United States Patent [19]

Walles

[11] 3,959,561

[45] May 25, 1976

[54] TRANSPARENT ASTATIC RESINOUS ARTICLES AND METHOD FOR THEIR PRODUCTION

[75] Inventor: Wilhelm E. Walles, Midland, Mich.

[73] Assignee: The Dow Chemical Company, Midland, Mich.

[22] Filed: June 28, 1971

[21] Appl. No.: 157,604

Related U.S. Application Data

[63] Continuation-in-part of Ser. No. 773,969, Nov. 6, 1968, which is a continuation-in-part of Ser. No. 686,715, Nov. 29, 1967, abandoned.

[52] U.S. Cl. ............................. 428/412; 427/163; 427/248; 427/337
[51] Int. Cl.² ........................................ B29D 11/00
[58] Field of Search .... 117/47 A, 118, 62, 138.8 U, 117/139.5 U; 427/163, 248, 337; 428/412

[56] References Cited
UNITED STATES PATENTS

| | | | |
|---|---|---|---|
| 2,727,831 | 12/1955 | Dixon | 117/62 |
| 2,786,780 | 3/1957 | Walles et al. | 117/47 A |
| 2,832,697 | 4/1958 | Walles | 117/47 A |
| 2,832,698 | 4/1958 | Walles | 117/47 A |
| 2,832,699 | 4/1958 | Walles | 117/47 A |
| 2,937,066 | 5/1960 | Walles | 117/47 A |
| 3,578,484 | 5/1971 | Walles et al. | 117/47 A |
| 3,607,350 | 9/1971 | Rathsack | 117/47 A |
| 3,625,751 | 12/1971 | Walles | 117/118 |
| 3,682,786 | 8/1972 | Brown et al. | 117/47 A |
| 3,684,554 | 8/1972 | Donald et al. | 117/47 A |

*Primary Examiner*—Bernard D. Pianalto
*Attorney, Agent, or Firm*—R. G. Waterman; M. S. Jenkins; L. J. Dankert

[57] ABSTRACT

A method for the rapid rendering of transparent polymer articles astatic by treating the articles with dilute gaseous sulfur trioxide followed by treatment with base such as ammonia and water or dilute aqueous ammonia. The articles are rendered permanently astatic without affecting their transparency by this process.

9 Claims, No Drawings

TRANSPARENT ASTATIC RESINOUS ARTICLES AND METHOD FOR THEIR PRODUCTION

CROSS REFERENCES

This application is a continuation-in-part of Ser. No. 773,969 filed Nov. 6, 1968 which is a continuation-in-part of Ser. No. 686,715 filed Nov. 29, 1967, now abandoned.

BACKGROUND OF INVENTION

This invention relates to the vapor phase sulfonation and neutralization of solid, transparent, resinous polymers to render the surfaces thereof astatic.

It is known from U.S. Pat. No. 2,727,831 that articles of polystyrene can be rendered astatic by liquid phase sulfonation with concentrated sulfuric acid or fuming sulfuric acid followed by treatment with an alkali. It is also known to sulfonate plastics for other reasons as disclosed in U.S. Pat. Nos. 2,400,720, 2,832,698 and 2,937,066 using a variety of sulfonating agents.

This prior art process has various defects in that the sulfonation treatment is slow since the acid has to be drained off the polymer surface for several minutes and then washed with water to remove all traces of the acid. Furthermore, the prior art sulfonation process sometimes renders the polymer yellow or brown and this requires an additional step of bleaching to remove the discoloration. Finally, this prior art sulfonation process has to be run at a relatively high temperature of from about 55° to about 90°C.

SUMMARY OF INVENTION

It has now been found that articles produced from solid, transparent, resinous polymers can be treated with gaseous sulfur trioxide in an inert diluent and neutralized with a base such as ammonia to produce articles rapidly which are not discolored by the treatment and have a permanent astatic surface which is distortion free, i.e., not visibly altered from the surface prior to treatment.

This invention is notable in that the process thereof is fast and does not result in any visible change in the gloss and color of the plastic substrate yet it is rendered permanently astatic.

The present process is thus of utility in manufacturing operations where speed and clarity are essential as for example in the mass production of astatic clear plastic convertible automobile rear windows, dashboard covers, clock face-covers, marine plastic windows, helmet visors, and instrument lenses, lenses and films.

DETAILED DESCRIPTION OF THE PREFERRED EMBODIMENTS

Polymers suitably treated in the practice of this invention are sulfonatable, transparent polymers. By "sulfonatable polymer" is meant a polymer having replaceable hydrogen atoms bonded to carbon atoms. Thus, a polymer such as polytetrafluoroethylene cannot be used as a substrate in the practice of this invention because it does not have any replaceable hydrogen atoms and threfore is not sulfonatable.

Exemplary suitable polymers are the transparent polymers of the following monomers: the monovinylidene carbocylic aromatic monomers such as styrene, t-butylstyrene, $\alpha$-methyl styrene, and ar-chlorostyrene; aliphatic halo-olefins such as vinyl chloride, vinylidene chloride and chlorinated polyethylene; alkyl esters of $\alpha,\beta$-ethylenically unsaturated carboxylic acids having alkyl moieties of 1 to 12 carbon atoms and acid moieties of 3 to 8 carbon atoms such as methyl acrylate, ethyl acrylate and methyl methacrylate; $\alpha,\beta$-ethylenically unsaturated nitriles and amides having 3 to 10 carbon atoms such as acrylonitrile and acrylamide and the like. Also included are other transparent polymers such as polyesters, e.g., polyethylene terephthalate and the like; polyphenylene oxide resins; aromatic polycarbonate resins such as the polyarylcarbonates, e.g., polyesters of carbonic acid and alkylidenediphenols such as bis(p-hydroxyphenyl)methane, 2,2-bis(m-hydroxyphenyl)butane, 1,1-bis(o-hydroxyphenyl)ethane, 2,2-bis(p-hydroxyphenyl)propane (i.e., isopropylidenebisphenol), 1,1-bis(p-hydroxyphenyl)cyclohexane (i.e., cyclohexylidene bisphenol) and the like; polyamide resins such as nylon; polyesters such as polyethylene terephthalate; polymers of 4-methylpentene-1 and other transparent sulfonatable plastic polymers such as polyimides and rubber hydrochloride. This invention is also applicable to transparent copolymers such as the copolymers of vinyl esters and vinyl halides and the partially neutralized copolymers of ethylene and acrylic acid.

Of the foregoing suitable polymers, the polymers of monovinylidene carbocyclic aromatic monomers, the polymers of methyl methacrylate, polymers of 4-methylpentene-1 (commonly called "TPX" polymers), the polyimides and the polyesters are preferred.

Especially preferred are homopolymers of styrene and other monovinylidene carbocylic aromatic monomers and copolymers of at least 10 weight percent styrene and/or monovinylidene carbocylic aromatic monomer with polymerizable unsaturated, substituted or unsubstituted hydrocarbon, comonomers. In general, the substituted hydrocarbon comonomers will be substituted by chlorine, cyano, alkanoic acyl groups of 1–4 carbon atoms, alkanoic acyloxy groups of 1–4 carbon atoms and carboalkoxy groups of 1–4 carbon atoms. Non-limiting examples of the substituted unsaturated hydrocarbon comonomers are vinyl chloride, vinylidene chloride, chloroprene, vinyl acetate, vinyl propionate, vinyl butyrate, methyl acrylate, methyl methacrylate, acrylonitrile, methacrylonitrile, maleic anhydride, n-propyl vinyl ketone, methyl vinyl ketone, methyl isopropenyl ketone and vinylidene cyanide. Non-limiting examples of unsubstituted unsaturated comonomers are ethylene, propylene, isobutylene, 1,3-butadiene and isoprene. Examples of such styrene copolymers are the ones prepared by copolymerizing at least about 10 percent by weight of styrene with from about 1 to about 90 percent by weight of ethylenically unsaturated nitrile such as acrylonitrile and methacrylonitrile, these copolymers are noted for their clarity, strength, toughness, and stress crack resistance. Also advantageously utilized in the practice of this invention are copolymers of acrylonitrile and methyl methacrylate.

The surface sulfonation of the polymer involves the vapor phase treatment of the above polymers with sulfur trioxide in an inert diluent such as sulfur dioxide, nitrogen, air and carbon dioxide. The amount of sulfur trioxide used in the sulfonation step is such that the volume percent of sulfur trioxide in the inert diluent is in the range from about 0.1 to 10 volume percent.

The time of contact of the polymer with the sulfonation agent is variable depending upon the concentration and the temperature as is well known to those skilled in the art. Generally, the contact time will vary from 0.01 to 100 seconds when operating within the above concentration range.

The temperature at which the sulfonation step takes place is not critical and can vary from −20° to about 100°C. It is, of course, obvious that at the lower end of the operable temperature range, the higher contact times are used.

Generally speaking, the preferred ranges are: temperature about 25°C; contact time about 0.02 to 50 seconds; concentration 0.1 to 10 volume percent of sulfur trioxide.

It is essential to control the sulfonation step within the ranges outlined above since if the polymer is over-sulfonated as by using too high a concentration for too long a time, too much swelling in contact with water occurs which damages the glossy surface of the transparent polymer. On the other hand, too little sulfonation is to be avoided since the polymer then does not have the requisite amount of sulfonic groups attached to it which when neutralized will give the surface the desired permanent astatic effect. Also, some materials are not uniformly sulfonated, i.e., are streaked when too little sulfonation is used.

The second step in this invention involves neutralization of the sulfonated surface. This is accomplishd by contacting the sulfonated surface or surfaces with a neutralizing agent. Any neutralizing agent capable of neutralizing the sulfonic acid groups of the sulfonated polymer surface is suitable for the purposes of this invention. Advantageous neutralizing agents include dilute aqueous solutions of alkali metal hydroxides or salts thereof and a weak acid; alkaline earth metal hydroxides or salts thereof and a weak acid; heavy metal chlorides or sulfates, primary, secondary or tertiary amines; quaternary ammonium salts; ammonia gas and ammonium hydroxide; and mixtures thereof. Neutralization can be effected by dipping the sulfonated surfaces into the foregoing aqueous solutions or suspensions or are sprayed or wiped with the solutions, washed with water and dried.

Examples of alkali metal hydroxides and weak acid salts which can be used are sodium hydroxide, potassium hydroxide, lithium hydroxide, sodium carbonate, sodium hypochlorite, sodium bicarbonate, sodium acetate, potassium carbonate, potassium bicarbonate, potassium acetate, lithium carbonate, lithium bicarbonate, and lithium acetate.

Examples of alkaline earth metal hydroxides or weak acid salts thereof are the water soluble calcium, barium, strontium and magnesium hydroxides, carbonates, and acetates.

Examples of the heavy metal chlorides and sulfates are stannous chloride, ferrous sulfate, nickel sulfate, cobalt sulfate and manganese sulfate.

Examples of the amines which can be used are primary, secondary and tertiary saturated aliphatic amines of 2–5 carbon atoms which are water soluble and are normally liquids at room temperature. Specific examples are amylamine, dipropylamine, triethylamine, diethylamine, ethylamine, diethylmethylamine, etc. Normally gaseous amines such as methylamine can also be used if desired. Suitable quaternary ammonium compounds include N-alkyl, trimethyl ammonium chlorides and related compounds listed in the book *Detergents and Emulsifiers* by McCutcheon, 1970, page 52.

In general, the above neutralizing agents are added to water in an amount such that the resulting aqueous solution contains about 0.1 to 35 weight percent of the neutralizing agent.

The contact time and temperature is not critical and a mere dipping or spraying at room temperature is sufficient. Advantageously, liquid phase neutralization is effected at temperatures in the range of from about −20°C to about 90°C with a contact time of about 1 to about 100 seconds.

Alternatively, the sulfonated surface is neutralized by contacting the surface with gaseous ammonia. If the neutralization is accomplished by contacting the sulfonated surface with gaseous ammonia, an additional step of contacting the surface with water in liquid or gaseous form is performed. For example the sulfonated surface which is neutralized with gaseous ammonia may be washed with water such as by spraying the neutralized surface with steam or water. It is also possible to use a mixture of steam and gaseous ammonia for the neutralization.

In the preferred vapor phase neutralization of the sulfonated polymer, the gaseous ammonia can be present in an amount of 0.1 to 100 volume percent in an inert diluent such as air or nitrogen.

The temperature at which neutralization is carried out can range from −20° to 90°C with 25°C being preferred with a contact time of about 0.01 to 100 seconds.

The apparatus used in this invention is not critical. The vapor phase sulfonation and neutralization steps can be performed manually in open top dipping tanks. Where the sulfonating mixture is heavier than air as with carbon dioxide and sulfur trioxide, the tank can be upright. Where the neutralization mixture is lighter than air as with ammonia and air, the tank can be inverted. For large volume production, the molded parts of polymer can be suspended on a moving conveyor which passes through a sulfonation treatment box followed by an intermission box for air cleaning and then a gaseous ammonia neutralization treatment box.

The process of this invention results in a polymer having a surface rendered permanently astatic. The polymer is believed to be rendered astatic by the presence of a plurality of neutralized sulfonic acid groups which are permanently attached by chemical bonds to the carbon atoms of the polymer. A plurality of neutralized sulfonic acid groups is intended to mean an amount from about 0.001 to 10 milligrams of sulfur trioxide equivalents per square centimeter of treated polymer surface, said sulfur trioxide equivalents being in the form of neutralized sulfonic acid groups. The preferred range is from about 0.002 to .010 milligrams per square centimeter. These neutralized sulfonic acid groups absorb and retain water molecules by coordinate bonding so that water is chemically retained even after prolonged drying. This results in a polymer surface in which the static charges leak off or are never formed and hence no static dust build up is observed.

The astatic quality of the polymers produced by this invention can be demonstrated by a simple "ash" test. In this test, the surface of the plastic article is rubbed with a dry woolen cloth for a few seconds to develop an electrostatic charge. When this charged plastic is held about one-half inch above a quantity of comminuted cigarette ashes, the untreated polymer surface normally attracts and holds the ashes tenaciously and results in a dirty appearance. Polymer surfaces or small areas of polymer surfaces that have been treated by the present invention are not charged by rubbing and do not attract any ashes at all. Thus, the products of this process all pass the ash test.

The following examples are presented to illustrate but not in any manner limit the invention.

EXAMPLE 1

A clear, molded piece of styrene-acrylonitrile having substantially 72 percent by weight styrene and 28 percent by weight of acrylonitrile and a melt flow of 4.0 as determined by condition I of ASTM D-1238-65T, tensile strength of 10,000 pounds f/in$^2$ (ASTM D-638-61T) Izod impact strength of 0.40 ft. pound f/in. of notch (ASTM D-256-56) and and a specific gravity of 1.08 (ASTM D-792-60T) is dipped into a glass walled tank containing about 3 percent sulfur trioxide in an atmosphere of carbon dioxide maintained at 25°C with agitation provided by means of electric stirrers.

The piece is held in this tank for 30 seconds and then placed in a glass walled tank containing about 5 percent by weight of ammonia in air. Contact time in this bath is 30 seconds.

As the final step, the piece is dipped into a water bath and dried.

It is found that the so-treated piece would not pick up ashes by the aforementioned ash test and thus is rendered substantially completely astatic. This is further proved by the surface resistivity of the piece. Thus, when 500 volts D.C. is applied to two electrodes two centimeters in length spaced two centimeters apart and clamped to the copolymer at room temperature and at 80% relative humidity, the surface resistivity is found to be $10^6$–$10^{10}$ ohm per square depending on the severity of the treatment. In contrast to this, an untreated sample has a value of $10^{12}$–$10^{14}$ ohm per square.

EXAMPLE 2

The procedure set forth in Example 1 is followed except that in place of the ammonia-air bath and water bath an aqueous solution of 1 percent by weight of ammonia is used. The test results are the same showing that these alternative steps are operable.

EXAMPLES 3–7

Following the procedure of Example 1, plaques (4 × 11 × ⅛ inches) of the following polymers are treated with 2 percent sulfur trioxide in carbon dioxide for 1 minute and then with 2 percent aqueous ammonia. These samples are then tested by the foregoing procedure for their surface resistance at 23°C and 50 percent relative humidity.

The results are given in Table I.

EXAMPLE 8

It is found that when a temperature sensitive experiment is set up to run in the laboratory for a relatively long period of time such as days or weeks and this experiment is monitored or controlled by temperature indicating thermocouples having a molded polymethyl methacrylate cover, the experiment is sometimes ruined by the janitorial staff wiping the plastic covers to remove accumulated dust. This is due to the fact, that the electrostatic charge built up by the wiping is enough to attract (or repell) the delicate indication needle of the instrument. In one instance, the true reading of 25°C is changed to 150°C by a brisk rubbing. This problem has led to the replacement of the plastic covers with glass covers. This substitution solves this electrostatic problem but introduces the problem of breakage.

The problem is solved by the procedure set forth below.

Six molded polymethyl methacrylate covers for a temperature indicating thermocouple are removed from the instruments and sulfonated for 2 minutes in 2 percent sulfur trioxide diluted with carbon dioxide, dipped into a 2 percent aqueous solution of ammonia and dried.

Upon reassembling these covers back on the instrument, it is found that the covers are not distorted and that it is impossible to give the treated covers an electrostatic charge by a brisk rubbing with a wiping cloth. Hence, the needle indicating the temperature of the thermocouple remains constant and accurate.

A control set of six untreated covers are given the same brisk rubbing with a wiping cloth and produced false readings due to the electrostatic charge on the cover attracting (or repelling) the needle of the instrument.

EXAMPLE 9

Four molded articles, (Sample Nos. 1–4) one of polystyrene, one of poly(methyl methacrylate), one of poly(4-methyl-pentene-1) and one of styrene/acrylonitrile (72/28) copolymer are suspended in a gaseous mixture consisting of 2 volume percent sulfur trioxide in carbon dioxide for 2 minutes at 25°C. The articles are suspended so that the entire widths of the articles are in the gaseous mixture containing $SO_3$. The resulting surface sulfonated articles are then neutralized in an aqueous solution of 2 percent ammonia and dried.

For purposes of comparison and to show the advantages of the process of the present invention over other methods for rendering articles antistatic, articles of the foregoing polymers are surface sulfonated and neutralized using the methods described as follows:

TABLE I

| Examples | Polymer | Resistance before Sulfonation (ohms/square) | Resistance after Sulfonation (ohms/square) |
|---|---|---|---|
| 3 | Surlyn A (partially neutralized copolymer of ethylene and acrylic acid) | 3 × 10$^{13}$ | 2 × 10$^9$ |
| 4 | Polymethyl methacrylate | 5 × 10$^{13}$ | 3.5 × 10$^9$ |
| 5 | Polyvinyl butyral | 2 × 10$^{10}$ | 1.4 × 10$^7$ |
| 6 | Polyvinyl chloride | 3 × 10$^{10}$ | 4 × 10$^8$ |
| 7 | Cellophane* | 4 × 10$^8$ | 2 × 10$^7$ |

*2 mil film
In each of the foregoing runs, the surface resistance can be further reduced by a factor of about ten by doubling the sulfur trioxide concentration or by doubling the sulfonation time.

For Sample Nos. $A_1$–$A_4$, the molded articles are completely immersed into a bath of 96 percent by weight of concentrated sulfuric acid for 2 minutes at a temperature of 70°C. The articles are raised out of the sulfuric acid bath and allowed to drain for 1 minute. This is followed by a rinse in distilled water and neutralization in a 1N sodium hydroxide bath for 1 minute. The articles are then rinsed further in distilled water and allowed to dry.

For Sample Nos. $B_1$–$B_4$, the molded articles are treated to the same sequence of steps as for Sample Nos. $A_1$–$A_4$ except that they are dipped in a bath of chlorosulfuric acid instead of concentrated sulfuric acid.

For Sample Nos. $D_1$–$D_4$, the molded articles are immersed into 20 percent fuming sulfuric acid for 2 minutes at 25°C. These articles are then allowed to drain for 30 seconds and rinsed in distilled water. Following this, the articles are neutralized in 1N sodium hydroxide for 1 minute. The articles are then rinsed in distilled water and dried.

For Sample Nos. $E_1$–$E_4$, the molded articles are suspended in the vapors over free sulfur trioxide for 2 minutes. The articles were then neutralized in 0.1N sodium hydroxide, rinsed in distilled water, and dried.

For Sample Nos. $F_1$–$F_4$, the molded articles are treated in the same manner as Sample Nos. $E_1$–$E_4$ except that an aqueous solution of 2% ammonia is substituted for the sodium hydroxide in the neutralization step.

The foregoing samples are tested for transparency, surface resistivity and water resistance and the results are recorded in Table II.

For the control sample, Sample Nos. $C_1$–$C_4$, the molded articles which are not treated with sulfonating or neutralizing agents are tested for transparency, surface resistivity and water resistance and the results are recorded in Table II.

TABLE II

| Sample No. | Polymer | Transparency | Surface Resistivity Ohms/square (1) | Water Resistance |
|---|---|---|---|---|
| $A_1$* | Polystyrene | Fair | $1.5 \times 10^8$ | Sulfonation layer easily removed |
| $B_1$* | " | Non-transparent | $1.2 \times 10^5$ | Sulfonation layer easily removed |
| $D_1$* | " | Fair | $1.2 \times 10^6$ | Sulfonation layer easily removed |
| $E_1$* | " | Slight haze | $1.4 \times 10^6$ | Non-uniform sulfonation |
| $F_1$* | " | Slight haze | $3.3 \times 10^5$ | Non-uniform sulfonation |
| 1 |  | Excellent, completely invisible | $1.2 \times 10^6$ | Not damaged, uniform sulfonation layer, not removable by treatment with water |
| $C_1$* | " | Excellent | $>10^{16}$ | — |
| $A_2$* | poly(methyl methacrylate) | Non-transparent | $5 \times 10^6$ | Severely damaged |
| $B_2$* | " | Non-transparent, degraded | $2 \times 10^4$ | Completely degraded |
| $D_2$* | poly(methyl methacrylate | Non-transparent | $>10^{14}$ | Damaged |
| $E_2$* | " | Slight haze, non-uniform sulfonation | $1 \times 10^6$ | Non-uniform sulfonation |
| $F_2$* | " | Slight haze, non-uniform sulfonation | $1.6 \times 10^{12}$ | Non-uniform sulfonation |
| 2 | " | Excellent, completely invisible | $1 \times 10^{12}$ | Not damaged, uniform sulfonation layers, not removable with water |
| $C_2$* | " | Excellent | $>10^{16}$ | — |
| $A_3$* | poly(methyl pentene-1) | Fair | $>10^{14}$, antistatic properties not sufficiently improved | Satisfactory |
| $B_3$* | " | Fair, but stress cracked | $>10^{14}$, antistatic properties not sufficiently improved | Satisfactory |
| $D_3$* | " | Fair, but off color | $3.3 \times 10^{11}$ | Non-uniform sulfonation |
| $E_3$* | poly(methyl pentene-1) | Fair, but non-uniform sulfonation | $3.3 \times 10^8$ | Non-uniform sulfonation |
| $F_3$* | " | Fair, but non-uniform sulfonation | $3.3 \times 10^8$ | Non-uniform sulfonation |
| 3 | " | Excellent, completely invisible | $2.5 \times 10^7$ | Non-damaged, uniform sulfonation layer, not removable by treatment with water |
| $C_3$* | " | Excellent | $>10^{16}$ | — |
| $A_4$* | Styrene/acrylonitrile copolymer | Very poor | $8 \times 10^7$ | Sulfonation layer easily removed |
| $B_4$* | " | Non-transparent white surface | $5 \times 10^7$ | Sulfonation layer easily removed |
| $D_4$* | " | Poor | $1.3 \times 10^8$ | Sulfonation layer easily removed |
| $E_4$* | " | Fair, but patchy | $1.2 \times 10^9$ | Non-uniform sulfonation |
| $F_4$* | Styrene/acrylonitrile copolymer | Fair, but patchy | $3 \times 10^8$ | Non-uniform sulfonation |
| 4 | " | Excellent, completely invisible | $3 \times 10^7$ | Non-damaged, uniform sulfonation layer, not removable by treatment with water |
| $C_4$* | " | Excellent | $10^{15}$ | — |

*Not an Example of the invention
(1) Surface resistivity is measured by applying 500 volts (D.C.) to two electrodes two centimeters in length spaced two centimeters apart and clamped to the copolymer at room temperature and at 40% relative humidity for Sample Nos. $A_4$, $B_4$, $C_4$, $D_4$, $E_4$, $F_4$ and 4 and at 78% relative humidity for the remaining samples.

In the foregoing samples, the control samples, Sample Nos. $C_1$–$C_4$ and the articles which are treated in accordance with the prior art techniques, Sample Nos. $A_1$–$A_4$, $B_1$–$B_4$, and $D_1$–$D_4$, are either not sufficiently antistatic to be of real utility or are generally formed with a water swellable layer of sulfonated polymer which is generally cloudy and which, in contact with water, swells and destroys the glossy, transparent surface.

The foregoing articles which are treated with free sulfur trioxide, Sample Nos. $E_1$–$E_4$ and $F_1$–$F_4$, are generally hazy and have non-uniform distribution of sulfur trioxide equivalents on the surfaces thereof.

The foregoing articles which are treated in accordance with the process of the invention, Sample Nos. 1–4, exhibit excellent antistatic properties, are completely transparent, have uniform distribution of sulfur trioxide equivalents on the surfaces thereof, and are not damaged by water contact.

EXAMPLE 10

Several samples of the following polymers:
polyimide
polyethylene terephthalate
rubber hydrochloride are sulfonated by contacting the samples with 2% sulfur trioxide in carbon dioxide at the times specified in Table III and then neutralized with gaseous ammonia.

The treated samples are tested for degree of sulfonation and electrical conductivity and the results are recorded in Table III. In all instances, the samples remain transparent after treatment.

For purposes of comparison, untreated samples (Sample Nos. $C_1$–$C_3$) of the foregoing polymers are also tested for electrical conductivity and the results are recorded in Table III.

TABLE III

| Sample No. | Polymer | Exposure Time to $SO_3$ Gas, sec | Concentration of $SO_3$ (1) mg/cm$^2$ | Electrical Conductivity | Surface Resistivity Ohms/square |
|---|---|---|---|---|---|
| 1 | Polyimide ** | 11 | 0.0014 | Conductive | Not Determined |
| 2 | " | 20 | 0.0018 | " | " |
| 3 | " | 35 | 0.0032 | " | " |
| 4 | " | 75 | 0.0035 | " | " |
| 5 | " | 140 | 0.0091 | " | " |
| 6 | " | 260 | 0.021 | " | " |
| $C_1$* | " | 0 | 0 | Non-conductive | " |
| 7 | Polyethylene terephthalate | 7–8 | ~0.001 | Conductive | 4 × 10$^{12}$ |
| 8 | " | 16 | 0.0016 | " | 2 × 10$^{11}$ |
| 9 | " | 45–50 | 0.0027 | " | 3 × 10$^{10}$ |
| 10 | " | 195 | 0.0086 | " | 2 × 10$^9$ |
| $C_2$* | " | 0 | 0 | Non-conductive | >10$^{15}$ |
| 13 | Rubber Hydrochloride | 6 | ~0.001 | Conductive | 6 × 10$^{12}$ |
| 14 | Rubber Hydrochloride | 12 | 0.0037 | Conductive | 4 × 10$^{10}$ |
| 15 | " | 20 | 0.0089 | " | 3 × 10$^9$ |
| 16 | " | 35 | 0.014 | " | 8 × 10$^8$ |
| 17 | " | 72 | 0.030 | " | 4 × 10$^8$ |
| 18 | " | 140 | 0.033 | " | 1 × 10$^8$ |
| $C_3$* | " | 0 | 0 | Non-conductive | 10$^{15}$ |

\* Not an example of the invention
\*\* Derived from dianhydride of aromatic tetracarboxylic acid and organic diamine
(1) Cencentration in milligrams/square centimeter of sulfur trioxide equivalents.

What is claimed is:

1. A process for rendering a solid transparent article of a sulfonatable organic polymer permanently astatic, said polymer being selected from the group consisting of homopolymers of monovinylidene carbocylic aromatic monomer, copolymers of at least 10 weight percent of monovinylidene carbocylic aromatic monomer with polymerizable substituted hydrocarbon and unsubstituted hydrocarbon; polymers of methyl methacrylate, the aromatic polycarbonates, polymers of 4-methylpentene-1, polyesters, rubber hydrochlorides, and polyimides, which process comprises (a) contacting the surface of said article with gaseous sulfur trioxide in an inert gaseous diluent, the concentration of sulfur trioxide in the inert diluent being in the range of from about 0.1 to about 10 volume percent and (b) neutralizing the resulting surface sulfonated article with a neutralizing agent, whereby an amount of between about 0.001 and about 10 milligrams per cm$^2$ of sulfur trioxide equivalents in the form of neutralized sulfonic acid groups are produced on the surface of said article whereby the article remains transparent.

2. The process according to claim 1 wherein the neutralizing agent is selected from the group consisting of gaseous ammonia and dilute aqueous solutions of alkali metal hydroxides and salts thereof and a weak acid; alkaline earth metal hydroxides and salts thereof and a weak acid; heavy metal chlorides and sulfates; primary, secondary and tertiary amines, quaternary ammonium salts, ammonia and ammonium hydroxide and mixtures thereof.

3. The process according to claim 1 wherein the neutralizing agent is gaseous ammonia.

4. The process according to claim 3 wherein the polymer is selected from the group consisting of polymers of at least 10 weight percent of monovinylidene aromatic carbocylic monomer, poly(methyl methacrylate), aromatic polycarbonates, and poly(4-methylpentene-1) and polyethylene terephthalate.

5. An astatic transparent article of a sulfonatable organic polymer having on its surface a plurality of neutralized sulfonic acid groups chemically bonded to said surface in a concentration in the range of from about 0.001 to about 10 milligrams of sulfur trioxide equivalents per cm$^2$ of surface.

6. The article according to claim 5 wherein the neutralized sulfonic acid groups are the neutralization product of sulfonic acid and a neutralizing agent selected from the group consisting of gaseous ammonia and dilute aqueous solutions of alkali metal hydroxides and salts thereof and a weak acid; alkaline earth metal hydroxides and salts thereof and a weak acid; heavy metal chlorides and sulfates; primary, secondary and tertiary amines, quaternary ammonium salts, ammonia and ammonium hydroxide and mixtures thereof.

7. The article according to claim 5 wherein the neutralized sulfonic acid groups are ammonium sulfonate groups.

8. The article according to claim 5 wherein the polymer is selected from the group consisting of homopolymers of monovinylidene carbocylic aromatic monomer, copolymers of at least 10 weight percent of monovinylidene carbocylic aromatic monomer with polymerizable substituted hydrocarbon and unsubstituted hydrocarbon; polymers of methyl methacrylate, the aromatic polycarbonates, and polymers of 4-methylpentene-1.

9. The article according to claim 7 wherein the polymer is selected from the group consisting of polymers of at least 16 weight percent of monovinylidene aromatic carbocylic monomer, poly(methyl methacrylate), poly(4-methyl pentene-1), polymers of acrylonitrile and methyl methacrylate.

* * * * *